US012581556B2

(12) United States Patent
Chu et al.

(10) Patent No.: US 12,581,556 B2
(45) Date of Patent: Mar. 17, 2026

(54) DEVICE, SYSTEM, AND METHOD FOR ENHANCED MULTI-LINK OPERATIONS

(71) Applicant: NXP USA, Inc.

(72) Inventors: Liwen Chu, San Ramon, CA (US);
Hongyuan Zhang, Fremont, CA (US);
Huiling Lou, Sunnyvale, CA (US)

(73) Assignee: NXP USA, Inc., Austin, TX (US)

( * ) Notice: Subject to any disclaimer, the term of this
patent is extended or adjusted under 35
U.S.C. 154(b) by 829 days.

(21) Appl. No.: 17/845,868

(22) Filed: Jun. 21, 2022

(65) Prior Publication Data

US 2022/0408508 A1 Dec. 22, 2022

Related U.S. Application Data

(60) Provisional application No. 63/362,421, filed on Apr.
4, 2022, provisional application No. 63/225,705, filed
on Jul. 26, 2021, provisional application No.
63/213,594, filed on Jun. 22, 2021.

(51) Int. Cl.
| | |
|---|---|
| *H04W 76/15* | (2018.01) |
| *H04L 1/00* | (2006.01) |
| *H04L 1/1607* | (2023.01) |
| *H04W 24/08* | (2009.01) |

(52) U.S. Cl.
CPC ........... *H04W 76/15* (2018.02); *H04L 1/0003*
(2013.01); *H04L 1/1621* (2013.01); *H04W
24/08* (2013.01)

(58) Field of Classification Search
CPC ..... H04W 76/15; H04W 24/08; H04W 84/12;
H04L 1/0003; H04L 1/1621
See application file for complete search history.

(56) References Cited

U.S. PATENT DOCUMENTS

| | | | | |
|---|---|---|---|---|
| 2020/0245249 A1* | 7/2020 | Medles | ................. | H04W 72/23 |
| 2021/0084711 A1* | 3/2021 | Park | .................. | H04W 72/0453 |
| 2021/0112543 A1* | 4/2021 | Das | ...................... | H04B 17/318 |
| 2021/0266965 A1* | 8/2021 | Ho | ...................... | H04W 56/001 |
| 2021/0274489 A1* | 9/2021 | Fang | ................. | H04W 72/0446 |
| 2022/0294583 A1* | 9/2022 | Lu | .......................... | H04L 5/0091 |
| 2023/0379999 A1* | 11/2023 | Kim | ...................... | H04W 76/20 |

OTHER PUBLICATIONS

Priority document for Lu et al. (2022/0294583) U.S. Appl. No.
63/162,090 Mar. 17, 2021 (Year: 2021).*
Priority document for Lu et al. (2022/0294583) U.S. Appl. No.
63/200,496 Mar. 11, 2021 (Year: 2021).*
Park, Minyoung, "CC34/CC36 Comment Resolution for EMLSR—
Part 2", IEEE 802.11-20/287r2, Jul. 19, 2021, (2021), 11 pgs.

(Continued)

*Primary Examiner* — Rina C Pancholi

(57) ABSTRACT

A device, a system, and a method for enhanced multi-link
operations are disclosed. In an embodiment, the device
includes a wireless network interface device implemented
on one or more integrated circuits (ICs), where the wireless
network interface device is configured to exchange, via a
radio associated with a link, frames according to an
enhanced multi-link radio mode, and switch from the frame
exchanges in the link to monitoring multiple links after at
least one of completion of the frame exchanges and a frame
exchange error.

19 Claims, 9 Drawing Sheets

(56)  References Cited

OTHER PUBLICATIONS

IEEE, "IEEE P802.11be ™/D1.4, Part 11: Wireless LAN Medium Access Control (MAC) and Physical Layer (PHY) Specifications Amendment 8: Enhancements for extremely high throughput (EHT)", Jan. 2022, 787 pgs.

U.S. Appl. No. 17/583,030; Not Yet Published; 49 pages (Jan. 24, 2022).

IEEE, "Part 11: Wireless LAN Medium Access Control (MAC) and Physical Layer (PHY) Specifications", IEEE Std 802.11-2020, Section 10.3.2.1, pp. 1641-1642.

IEEE, "Part 11: Wireless LAN Medium Access Control (MAC) and Physical Layer (PHY) Specifications", IEEE Std 802.11-2020, Section 11.2.6, p. 2111.

* cited by examiner

702

A MULTI-LINK DEVICE (MLD) EXCHANGES, VIA A RADIO, FRAMES ON A LINK ACCORDING TO AN ENHANCED MULTI-LINK RADIO MODE

704

THE MLD SWITCHES FROM THE FRAME EXCHANGES IN THE LINK TO MONITORING MULTIPLE LINKS AFTER AT LEAST ONE OF COMPLETION OF THE FRAME EXCHANGES AND A FRAME EXCHANGE ERROR

DEVICE, SYSTEM, AND METHOD FOR ENHANCED MULTI-LINK OPERATIONS

CROSS-REFERENCE TO RELATED APPLICATIONS

This application is entitled to the benefit of U.S. Provisional Patent Application Ser. No. 63/213,594, filed on Jun. 22, 2021, U.S. Provisional Patent Application Ser. No. 63/225,705, filed on Jul. 26, 2021, and U.S. Provisional Patent Application Ser. No. 63/362,421, filed on Apr. 4, 2022, each of which is incorporated by reference herein.

BACKGROUND

In multi-link operations, wireless devices, e.g., multi-link devices (MLDs), can execute various wireless operations, such as coordinate some features or operations for devices in a multi-link operation via one or more links. As an example, a non-access point (non-AP) MLD with enhanced Multi-Link Single-Radio (eMLSR) capability (e.g., an eMLSR non-AP MLD) may exchange frames with an access point (AP) MLD via a radio associated with one link. After the frame exchange, the non-AP MLD may use conventional radio switching techniques to switch the radio to monitor multiple links. However, the conventional radio switching techniques may be complicated and/or inefficient. As such, non-AP MLDs using the conventional radio switching techniques may experience restricted performance.

SUMMARY

A device, a system, and a method for enhanced multi-link operations are disclosed. In an embodiment, the device includes a wireless network interface device implemented on one or more integrated circuits (ICs), where the wireless network interface device is configured to exchange, via a radio associated with a link, frames according to an enhanced multi-link radio mode, and switch from the frame exchanges in the link to monitoring multiple links after at least one of completion of the frame exchanges and a frame exchange error.

In an embodiment, the device switches to monitoring the multiple links when a station (STA) of the device receives a frame addressed to another STA.

In an embodiment, the device switches to monitoring the multiple links when an STA of the device receives a frame with a Transmitter Address (TA) that differs from another TA of another frame that initiated the frame exchanges.

In an embodiment, the device switches to monitoring the multiple links when an STA of the device receives a Physical Layer Convergence Procedure (PLCP) Protocol Data Unit (PPDU) from an Overlapping Basic Service Set (OBSS).

In an embodiment, the device switches to monitoring the multiple links when a Coding Scheme (CS) mechanism indicates that a medium is idle at a predetermined time boundary, and where the predetermined time boundary is at least one of a Transmission (Tx) Point Coordination Function (PCF) Interframe Space (PIFS) (TxPIFS) slot boundary and a Tx Short Interframe Space (SIFS) (TxSIFS) slot boundary.

In an embodiment, an enhanced Multi-Link Single-Radio (eMLSR) timer starts when the device exchanges the frames, and where the device switches to monitoring the multiple links when a timeout of the eMLSR timer occurs.

In an embodiment, the device receives an indication included an Enhanced Multi-Link Operation (EMLO) Control field of a frame that solicits at least one of an Acknowledgement (Ack) frame and a Block Ack (BA) frame, and where the device switches to monitoring the multiple links when the device receives the indication included in the EMLO Control field.

In an embodiment, the device switches to monitoring the multiple links when a Transmission Opportunity (TXOP) ends.

In an embodiment, the frames are exchanged to initiate a first triggered TXOP sharing mode, and where the first triggered TXOP sharing mode includes an access point (AP) allocating a duration of a TXOP to an STA of the device, where the STA determines a PPDU length, a Modulation and Coding Scheme (MCS), and a number of spatial streams (Nss) for initiating additional frame exchanges with the AP during the allocated duration, and the STA exchanging the additional frames during the allocated duration unless the STA does not detect a responding PPDU within a predetermined time after transmitting a soliciting PPDU.

In an embodiment, the frames are exchanged to initiate a first triggered TXOP sharing mode, and where the first triggered TXOP sharing mode includes an AP allocating a duration of a TXOP to an STA of the device, where the STA determines a PPDU length, an MCS, and an Nss for initiating additional frame exchanges with the AP during the allocated duration, and the STA exchanging the additional frames during the allocated duration unless the STA detects a following PPDU within a predetermined time after transmitting a soliciting PPDU, where a detected frame in the following PPDU does not include a Receiver Address (RA) of the STA.

In an embodiment, the frames are exchanged to initiate a first triggered TXOP sharing mode, and where the first triggered TXOP sharing mode includes an AP allocating a duration of a TXOP to an STA of the device, where the STA determines a PPDU length, an MCS, and an Nss for initiating additional frame exchanges with the AP during the allocated duration, and the STA exchanging the additional frames during the allocated duration unless the STA receives a responding frame solicited by the STA, where the responding frame includes an indication to release the allocated duration to the AP.

In an embodiment, the frames are exchanged to initiate a second triggered TXOP sharing mode, and where the second triggered TXOP sharing mode includes an AP allocating a duration of a TXOP to an STA of the device, where the STA determines a PPDU length, an MCS, and an Nss for initiating additional frame exchanges with at least one of a peer STA and the AP during the allocated duration, and the STA exchanging the additional frames during the allocated duration unless the STA receives a responding frame solicited by the STA, where the responding frame includes an indication to release the allocated duration to the AP.

In an embodiment, the frames are exchanged to initiate a second triggered TXOP sharing mode, and where the second triggered TXOP sharing mode includes an AP allocating a duration of a TXOP to an STA of the device, where the STA determines a PPDU length, an MCS, and an Nss for initiating additional frame exchanges with at least one of a peer STA and the AP during the allocated duration, and the STA exchanging the additional frames during the allocated duration unless the STA does not detect a responding PPDU within a predetermined time after transmitting a soliciting PPDU.

In an embodiment, the device is a non-AP multi-link device (MLD), and where the non-AP MLD announces that it includes simultaneous transmit and receive (STR) links that can switch between a Multi-Link Single-Radio (MLSR) mode and an eMLSR mode.

In an embodiment, the device is a non-AP MLD, and where the non-AP MLD announces that it includes STR links that can switch between a non-STR (NSTR) Multi-Link Multi-Radio (MLMR) mode and an enhanced MLMR (eMLMR) mode.

In an embodiment, the device is a non-AP MLD, and where the non-AP MLD performs a medium access recovery after the device switches to monitoring the multiple links.

In an embodiment, the device is a non-AP MLD, and where the non-AP MLD includes a low cost radio for link monitoring and a full-functional radio for frame exchanges.

In an embodiment, the device is a non-AP MLD that uses STAs to monitor the multiple links, and where the STAs set a Network Allocation Vector (NAV) when the STAs detect a Duration field included in a received PPDU.

A system for enhanced multi-link operations is also disclosed. In an embodiment, the system includes a first MLD, where the first MLD includes a wireless network interface device implemented on one or more ICs, and where the wireless network interface device is configured to exchange frames, a second MLD, where the second MLD includes another wireless network interface device implemented on one or more other ICs, and where the wireless network interface device is configured to exchange, via a radio associated with a link, the frames with the first MLD according to an enhanced multi-link radio mode, and switch from the frame exchanges in the link to monitoring multiple links after at least one of completion of the frame exchanges and a frame exchange error.

A method for enhanced multi-link operations is also disclosed. In an embodiment, the method includes exchanging, via a radio of an MLD, frames on a link according to an enhanced multi-link radio mode, and switching, by the MLD, from the frame exchanges in the link to monitoring multiple links after at least one of completion of the frame exchanges and a frame exchange error.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
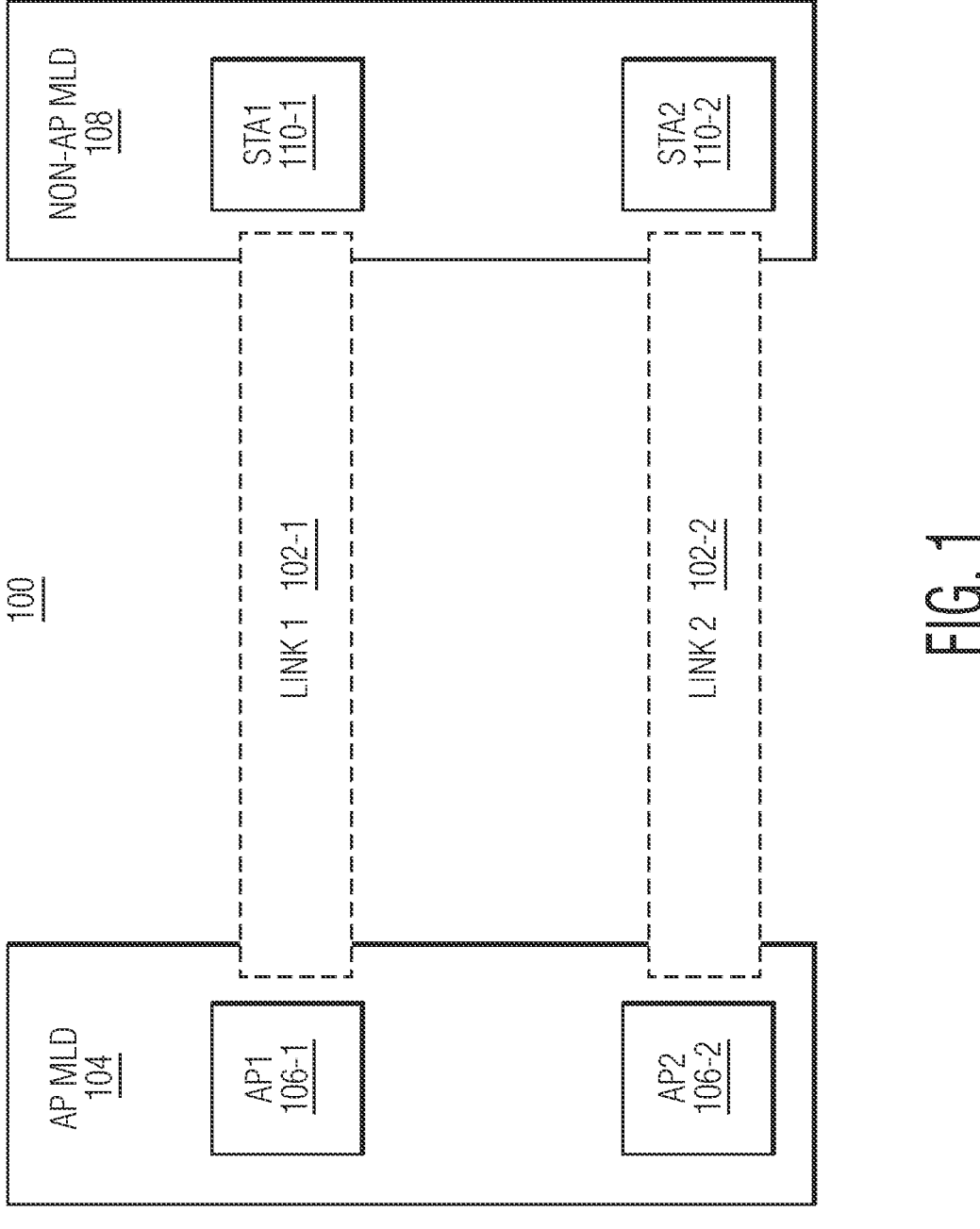
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., an access point (AP) multi-link device (MLD) of a wireless local area network (WLAN) may exchange data with at least one associated non-access point (non-AP) MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., Wi-Fi) communications. In the embodiment depicted in FIG. 1, the multi-link communications system includes one AP MLD, implemented as AP MLD 104, and one non-AP MLD (e.g., STA MLD), implemented as non-AP MLD 108. In an embodiment, the AP MLD 104 may be a first MLD, and the non-AP MLD 108 may be a second MLD. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two APs, AP1 106-1 and AP2 106-2 that may each include a radio. In some embodiments, a common part of the AP MLD 104 implements upper layer Media Access Control (MAC) functionalities (e.g., Beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device, such that the APs include a wireless network interface implemented on one more ICs. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a Local Area Network (LAN)) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 megahertz (MHz) BSS operating channel at 6 gigahertz (GHz) band and AP2 106-2 may operate in a 160 MHz BSS operating channel at 5 GHz band. Although the AP MLD 104 is shown in FIG. 1 as including two APs, other embodiments of the AP MLD 104 may include more than two APs or less than two APs.

In the embodiment depicted in FIG. 1, the non-AP MLD, implemented as non-AP MLD 108, includes two STAs (e.g., non-AP STAs), STA1 110-1 and STA2 110-2 that may each include a radio (e.g., a low cost radio or a full-functional radio). The STAs 110-1 and 110-2 may be implemented in hardware (e.g., circuits), software, firmware, or a combination thereof. The STAs 110-1 and 110-2 may be fully or partially implemented as an IC device, such that the STAs include a wireless network interface device implemented on one or more ICs. In some embodiments, the STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., link1 102-1 and link2 102-2. For example, each of the STAs 110-1 or 110-2 communicates with AP1 106-1 or AP2 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames in Physical Layer Convergence Procedure (PLCP) Protocol Data Units (PPDUs) (e.g., Date frames, Control frames, Management frames, Beacon frames, Action frames, etc.) between an AP MLD and a non-AP MLD. In some embodiments, a 20 MHz channel may be a punctured 20 MHz channel or an unpunctured 20 MHz channel. Although the non-AP MLD 108 is shown in FIG. 1 as including two STAs, other embodiments of the non-AP MLD 108 may include one STA or more than two STAs. In addition, although the AP MLD 104 communicates (e.g., wirelessly communicates) with the non-AP MLD 108 via multiple links 102-1 and 102-2, in other embodiments, the AP MLD 104 may communicate (e.g., wirelessly communicate) with the non-AP MLD 108 via more than two communication links or less than two communication links.

In some embodiments, an AP MLD initializes a frame exchange with a non-AP MLD with enhanced Multi-Link Single-Radio (eMLSR) capability (e.g., an eMLSR non-AP MLD) through one link by transmitting an initial control frame via an AP. A full-functional radio of the eMLSR non-AP MLD may then switch to the one link when the initial control frame is received and start an eMLSR timer for the frame exchanges. In an embodiment, the AP MLD can cancel the frame exchange using an indication (e.g., an indication included in an Enhanced Multi-Link Operation (EMLO) Control field) included in a frame transmitted to the eMLSR non-AP MLD. In such an embodiment, the frame that includes the indication can solicit (or not solicit) an Acknowledgement (Ack) frame or a Block Ack (BA) frame. According to conventional radio switching techniques, after the eMLSR non-AP MLD receives the frame that includes the indication, or a timeout of the eMLSR timer occurs, the radio of the eMLSR non-AP MLD may switch from the one link to monitor multiple links. Examples of conventional radio switching techniques are described in further detail with reference to FIG. 2A and FIG. 2B.

Figure 2A:
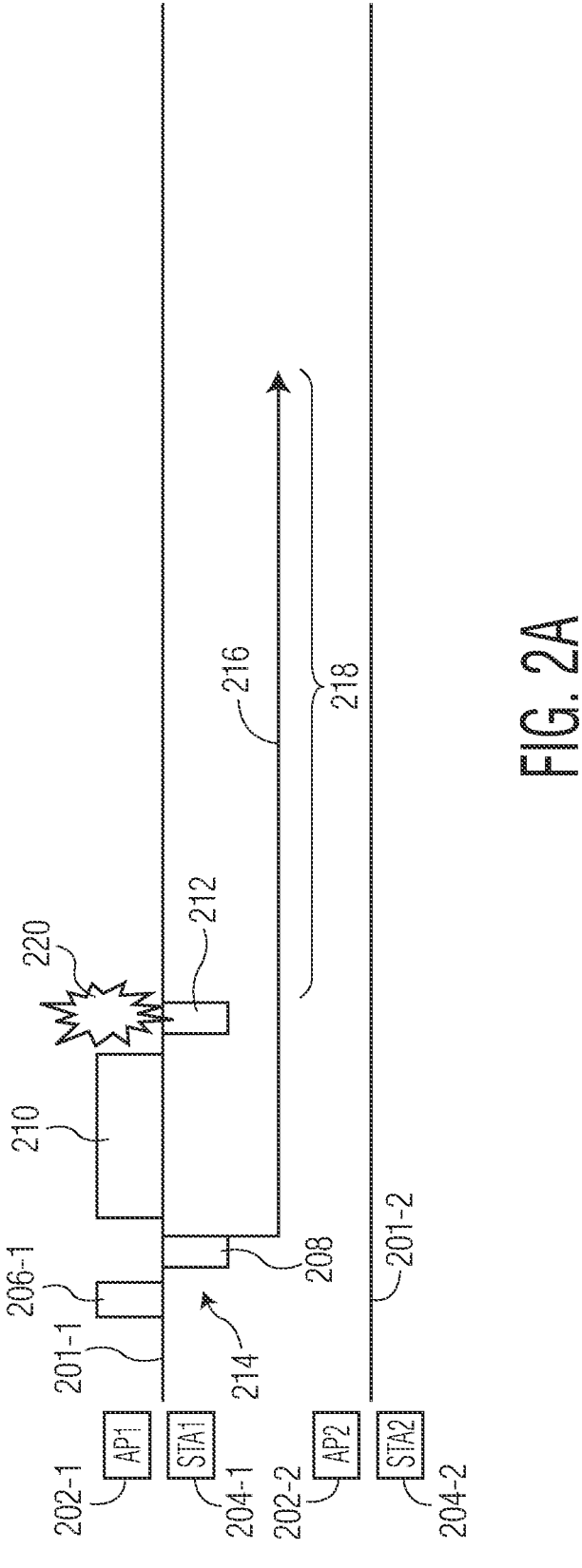
FIG. 2A illustrates an example of a conventional radio switching technique.

FIG. 2A illustrates an example of a conventional radio switching technique. In an embodiment, an AP MLD (not shown) with two affiliated APs, AP1 202-1 and AP2 202-2, operate on Link1 201-1 and Link2 201-2, respectively. In addition, an eMLSR MLD (e.g., an eMLSR non-AP MLD) (not shown) with two affiliated STAs, STA1 204-1 and STA2 204-2, associates with the APs 202-1 and 202-2 of the AP MLD on Link1 201-1 and Link2 201-2, respectively. In an embodiment, the APs 202-1 and 202-2 of the AP MLD and the STAs 204-1 and 204-2 of the eMLSR MLD are configured to exchange frames, for example, via radios (not shown) associated with the AP MLD and the eMLSR MLD. In some embodiments, the eMLSR MLD includes two radios (one full-functional radio and one low cost radio) that monitor Link1 201-1 and Link2 201-2 simultaneously (e.g., at the same time). In such an embodiment, the eMLSR MLD may use the conventional radio switching techniques described herein to switch the full-functional radio between monitoring one link or multiple links.

The frame exchanges begin when AP1 202-1 transmits a Multi-User (MU) Request to Send (RTS) (MU-RTS) frame 206-1, on Link1 201-1 to STA1 204-1, where the MU-RTS frame 206-1 solicits a response frame. When STA1 204-1 receives the MU-RTS frame 206-1, the full-functional radio of the eMLSR MLD switches to Link1 201-1 to exchange frames at a time 214. In addition, because the MU-RTS frame 206-1 solicits a response frame, STA1 204-1 transmits a Clear to Send (CTS) frame 208 on Link1 201-1 to AP1 202-1. In an embodiment, once STA1 204-1 completes transmission of the CTS frame 208, an eMLSR timer 216 starts (API 202-1 knows when the eMLSR timer 216 ends). As an example, the eMLSR timer 216 defines an amount of time during which the full-functional radio of the eMLSR MLD is used for frame exchanges in Link1 201-1 before switching back to monitoring multiple links (e.g., Link1 201-1 and Link2 201-2).

After receiving the CTS frame 208, AP1 202-1 transmits a MAC Protocol Data Unit (MPDU) frame 210 on Link1 201-1 to STA1 204-1, where the MPDU frame 210 solicits an Ack frame and includes an indication in an EMLO Control field. As an example, the indication included in the MPDU frame 210 indicates, to STA1 204-1, that AP1 202-1 is done transmitting frames to STA1 204-1 and/or that the eMLSR MLD should switch from frame exchanges in one link to monitoring multiple links. After receiving the MPDU frame 210, STA1 204-1 transmits an Ack frame 212 on Link1 201-1 to AP1 202-1. As an example, the Ack frame 212 indicates that the eMLSR MLD has switched its radio to monitoring multiple links.

However, the Ack frame 212 may not be received and/or accepted correctly, causing a frame exchange error 220 to occur. Because the AP MLD did not receive the Ack frame 212 that indicates that the eMLSR MLD has switched from the frame exchanges in one link to monitoring multiple links, the AP MLD waits until a timeout of the eMLSR timer 216 occurs before transmitting frames on Link1 201-1 or Link2 201-2. Thus, a time interval 218 where the AP MLD and the eMLSR MLD could exchange frames is wasted.

Figure 2B:
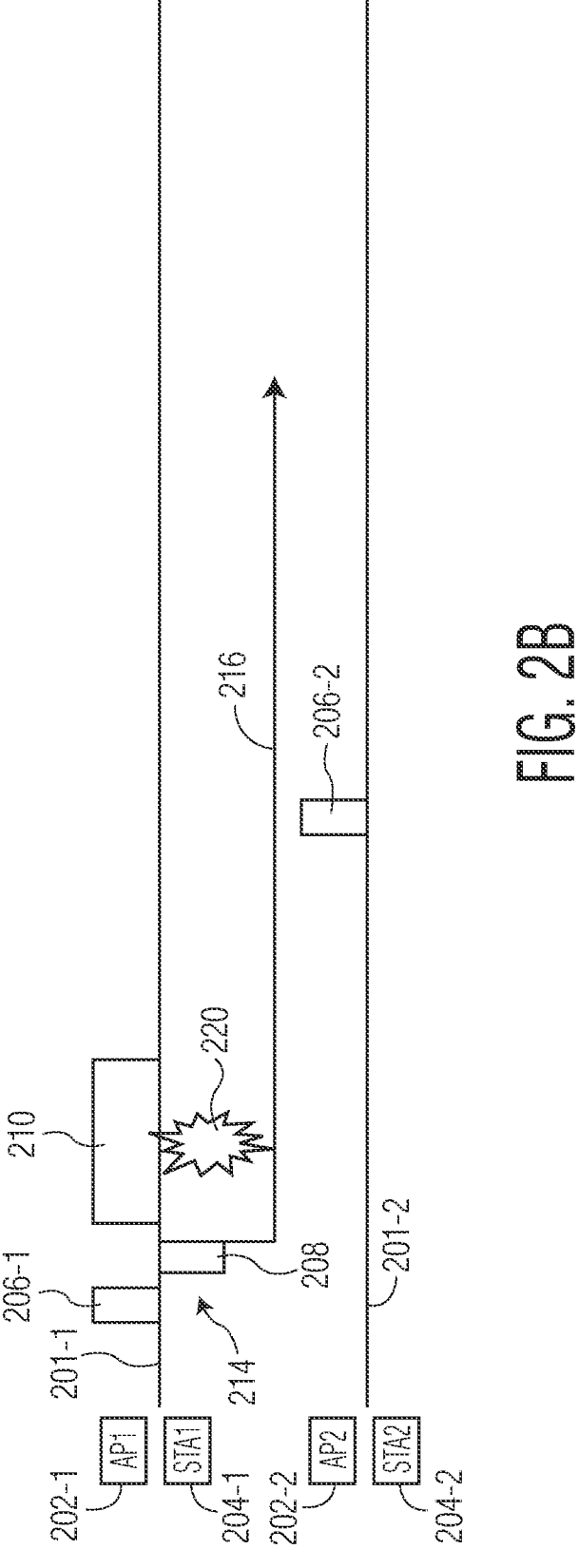
FIG. 2B illustrates another example of a conventional radio switching technique.

FIG. 2B illustrates another example of a conventional radio switching technique. In an embodiment, FIG. 2B includes the AP MLD (not shown) with AP1 202-1 and AP2 202-2, the eMLSR MLD (not shown) with STA1 204-1 and STA2 204-2, Link1 201-1, Link2 201-2, and exchange of the MU-RTS frame 206-1, the CTS frame 208, and the MPDU frame 210 with the radio switch at the time 214, the eMLSR timer 216, and the frame exchange error 220 as previously described with reference to FIG. 2A.

In contrast to FIG. 2A, the frame exchange error 220 occurs because STA1 204-1 does not properly receive the MPDU frame 210. The MPDU frame 210 of FIG. 2B includes the EMLO Control field but does not solicit an Ack frame (e.g., Ack Policy is no Ack policy) as described with reference to FIG. 2A. Because the MPDU frame 210 does not solicit an Ack frame and indicates, to STA1 204-1, for the radio of the eMLSR MLD to switch from Link1 201-1 to monitoring multiple links (e.g., Link1 201-1 and Link2 201-2), the AP MLD assumes that the eMLSR MLD received the MPDU frame 210 and that the radio has switched. However, because STA1 204-1 does not properly receive the MPDU frame 210, the radio has not switched and the eMLSR MLD assumes the AP MLD continues its frame exchanges in Link1 201-1 until a timeout of the eMLSR timer 216 occurs. As a result, when AP2 202-1 transmits another MU-RTS frame 206-2 on Link2 201-2 to STA2 204-2, STA2 204-2 does not receive (misses) the MU-RTS frame 206-2.

With reference to FIG. 2A and FIG. 2B, the conventional radio switching techniques may be complicated and/or inefficient as a result of time being wasted before the radio switches to monitoring the multiple links and/or transmitted frames not being properly received by an MLD (e.g., an AP MLD or a non-AP MLD).

In accordance with an embodiment of the invention, a technique for enhanced multi-link operations includes exchanging, via a radio of an MLD, frames on a link according to an enhanced multi-link radio mode, and switching, by the MLD, from the frame exchanges in the link to monitoring multiple links after at least one of completion of the frame exchanges and a frame exchange error. As an example, the MLD is a non-AP MLD (e.g., an STA MLD) or an AP MLD, and the radio is a full-functional radio. By switching from the frame exchanges in the link to monitoring the multiple links after completing the frame exchanges or the frame exchange error, MLDs may be able to avoid frame exchange errors, communicate more efficiently, and improve overall performance.

As described herein, "switching" may imply that a full-functional radio is switched to a link where frames are exchanged, or a full-functional radio and a low cost radio switch to different links for multiple link monitoring. As described herein, "monitoring" one or more links may imply that an MLD (e.g., a non-AP MLD or an AP MLD) is active or present on the link(s), is prepared to exchange frames on the link(s), and/or is exchanging frames on the link(s). In addition, as described herein, "exchanging frames" may imply that frames are being transmitted and/or received by a full-functional radio, an MLD, an AP, an STA, and/or another similar device.

In some embodiments, an MLD (e.g., a non-AP MLD or an AP MLD) may exchange frames according to an enhanced multi-link radio mode. Examples of an enhanced multi-link radio mode may include an eMLSR mode and/or an enhanced ML Multi-Radio (eMLMR) mode. Non-AP MLDs that exchange frames according to the eMLSR mode may have an eMLSR capability (e.g., the eMLSR MLD has one full-functional radio and one or more low cost radios, and the AP MLD uses specific frames and PPDU formats to notify the eMLSR MLD to switch the full-functional radio to a link for frame exchanges), and may be referred to herein as an eMLSR non-AP MLD or an eMLSR MLD. Non-AP MLDs that exchange frames according to the eMLMR mode may have an eMLMR mode capability (e.g., the eMLMR MLD has multiple full-functional radios, and the AP MLD uses any frame and PPDU format to notify the eMLMR MLD to switch multiple full-functional radios to a link for frame exchanges), and may be referred to herein as an eMLMR non-AP MLD or an eMLMR MLD.

In some embodiments, a non-AP MLD (e.g., an eMLSR non-AP MLD or an eMLMR non-AP MLD) may include a low cost radio and a full-functional radio (e.g., a 2×2 radio), such that the non-AP MLD switches the full-functional radio to a link that is connected to an associated STA (e.g., non-AP STA) to monitor and/or exchange frames on the link. As an example, a low cost radio may not be able to perform various high-functionality wireless operations and/or communications, such that the low cost radio may (only) be able to receive specific frames and PPDU formats. As an example, a full-functional radio may be able to perform the various high-functionality wireless operations and/or communications for receiving and transmitting frames in multiple PPDU formats. After the non-AP MLD switches the radio to exchange frames on the link, the non-AP MLD may switch from frame exchanges in the link to monitoring multiple links if an event occurs. Embodiments of events where a non-AP MLD switches from frame exchanges in a link to monitoring multiple links are described herein.

In one embodiment, the device (e.g., non-AP MLD) switches from frame exchanges in a link (e.g., link1) to monitoring multiple links when an STA of the non-AP MLD associated with link1 receives a frame addressed to another STA (or other STAs). In another embodiment, the non-AP MLD switches from frame exchanges in the link to monitoring the multiple links when the STA of the non-AP MLD associated with the link receives a frame with a Transmitter Address (TA) that differs from another TA of another frame that initiated frame exchanges (e.g., started a Transmission Opportunity (TXOP) for the frame exchanges). In yet another embodiment, the non-AP MLD switches to monitoring the multiple links when the STA of the non-AP MLD receives a PPDU from an Overlapping Basic Service Set (OBSS). In yet another embodiment, the non-AP MLD switches to monitoring the multiple links when a Coding Scheme (CS) mechanism (e.g., as described with reference to 10.3.2.1) indicates that a medium is idle at a predetermined time boundary and either that a responding frame is not received (if required) or that a following frame is not detected. In such an embodiment, the predetermined time boundary is, for example, a Transmission (Tx) Point Coordination Function (PCF) Interframe Space (PIFS) (TxPIFS) slot boundary or a Tx Short Interframe Space (SIFS) (TxSIFS) slot boundary.

In one embodiment, an eMLSR timer starts when a device (e.g., a non-AP MLD) transmits a responding frame that is solicited by an initial frame that is received from an AP MLD, and the non-AP MLD switches to monitoring multiple links when a timeout of the eMLSR timer occurs. In another embodiment, when the non-AP MLD receives an indication included an EMLO Control field of a frame that solicits an Ack frame or a BA frame, the non-AP MLD switches from frame exchanges in the link to monitoring the multiple links. In yet another embodiment, the non-AP MLD switches from frame exchanges in the link to monitoring the multiple links when a TXOP ends. In some embodiments, the non-AP MLD switches from frame exchanges in the link to monitoring the multiple links after an additional time defined by a radio switch time announced by the non-AP MLD. In some embodiments, an AP MLD and the non-AP MLD have an agreement (e.g., preconfigured settings) about one or more conditions for which the non-AP MLD switches to monitoring the multiple links. Examples of events where a non-AP MLD switches from frame exchanges in a link to monitoring multiple links are described in further detail with reference to FIGS. 3-6.

Figure 3:
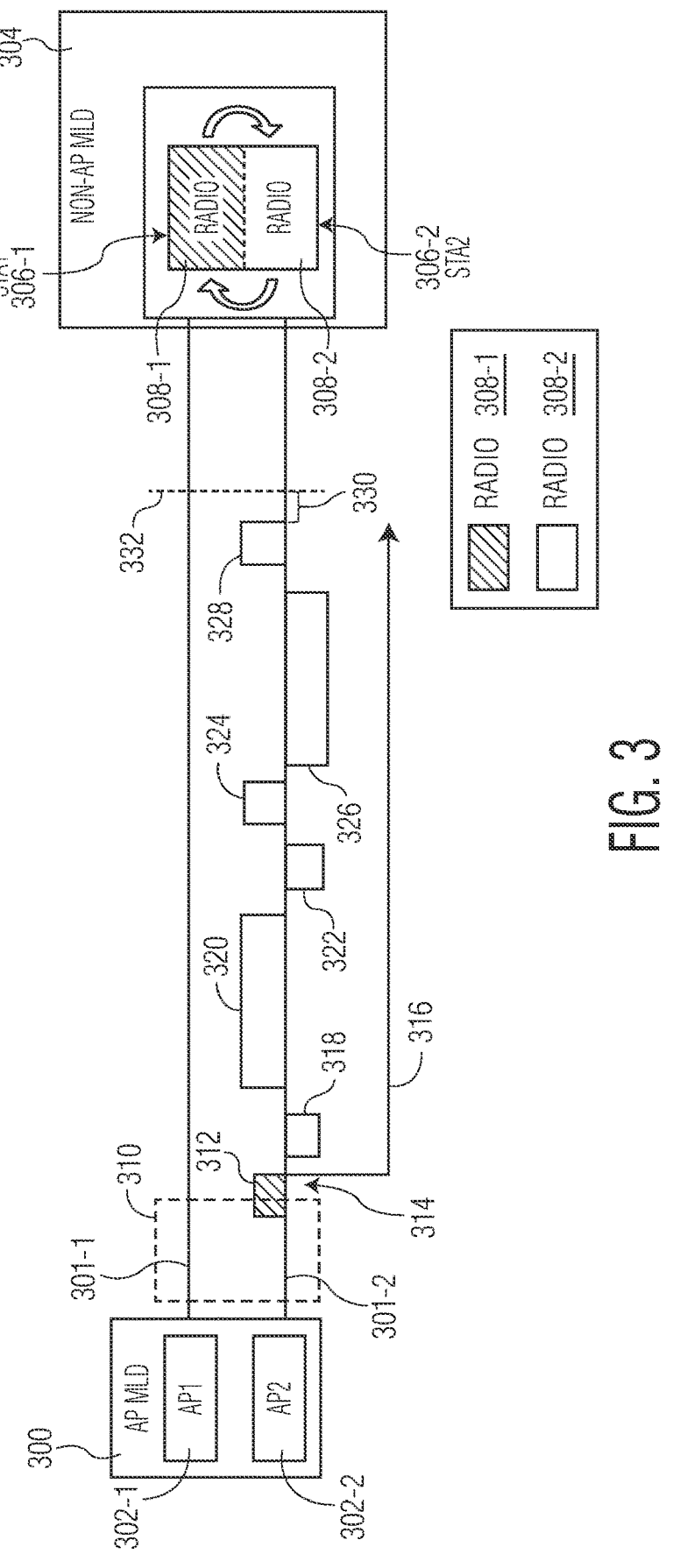
FIG. 3 illustrates an example of an event where a non-access point (non-AP) multi-link device (MLD) switches from frame exchanges in a link to monitoring multiple links.

FIG. 3 illustrates an example of an event where a non-AP MLD switches from frame exchanges in a link to monitoring multiple links. In an embodiment, an AP MLD 300 with two affiliated APs, AP1 302-1 and AP2 302-2, operate on Link1 301-1 and Link2 301-2, respectively. In addition, an eMLSR MLD, implemented as non-AP MLD 304, with two affiliated STAs, STA1 306-1 and STA2 306-2, associates with the APs 302-1 and 302-2 on Link1 301-1 and Link2 301-2, respectively. In an embodiment, the AP MLD 300 includes one or more radios (not shown) associated with AP1 302-1 and AP2 302-2, and the non-AP MLD 304 includes a first radio 308-1 and a second radio 308-2 that may associate with STA1 306-1 and/or STA2 306-2. As an example, the first radio 308-1 may be a low cost radio and the second radio 308-2 may be a full-functional radio (e.g., a 2×2 radio). In an embodiment, the APs 302-1 and 302-2 and the STAs 306-1 and 306-2 are configured to exchange frames, for example, via the radios associated with the AP MLD 300 and the non-AP MLD 304.

Before the frame exchange between the AP MLD 300 and the non-AP MLD 304 begins, the radios 308-1 and 308-2 monitor both Link1 301-1 and Link2 301-2 (shown by dashed box 310). In an embodiment, because the AP MLD 300 does not know which link the full-functional radio of the non-AP MLD 304 is associated with, after a backoff counter becomes zero on link2 302-2, the AP MLD 300 may need to transmit an initial MU-RTS frame to request that the non-AP MLD 304 switch its full-functional radio to link2 301-2. For example, the frame exchange begins when AP1 302-1 transmits an MU-RTS frame 312, on Link2 301-2 to STA2 306-2, where the MU-RTS frame 312 solicits a response frame for the non-AP MLD 304 to switch its radios and to start an eMLSR frame exchange sequence 316. In an embodiment, because the MU-RTS frame 312 is received by the first radio 308-1, and the first radio 308-1 associated with STA2 306-2 is not the full-functional radio, the radio switch occurs at the non-AP MLD 304. As such, the non-AP MLD 304 switches the radios at a first time 314 so that the second radio 308-2 (the full-functional radio) is associated with STA2 306-2 and can exchange frames in multiple PPDU formats on Link2 301-2.

After receiving the MU-RTS frame 312 and switching the radios, STA2 306-2 transmits a CTS frame 318 on Link2 301-2 to AP2 302-2. In response to receiving the CTS frame 318, AP2 302-2 transmits a first Aggregated-MPDU (A-MPDU) frame 320 to STA2 306-2 on Link2 301-2. Once STA2 306-2 receives the first A-MPDU frame 320, STA2 306-2 transmits a first BA frame 322 to AP2 302-2 on Link2 301-2. AP2 302-2 then transmits a trigger frame 324 to STA2 306-2 on Link2 301-2 that solicits a frame from STA2 306-2. After receiving the trigger frame 324, STA2 306-2 transmits a second A-MPDU frame 326 to AP2 302-2 on Link2 301-2. AP2 302-2 then transmits a second BA frame 328 to STA2 306-2 on Link2 301-2.

After STA2 306-2 receives the second BA frame 328, the eMLSR frame exchange sequence 316 ends and a medium (e.g., Link2 301-2) becomes idle. In an embodiment, a CS mechanism (e.g., as described with reference to 10.3.2.1) indicates that the medium is idle at a predetermined time boundary 330. In such an embodiment, the predetermined time boundary may be TxPIFS, TxSIFS, or another predetermined time boundary. As such, non-AP MLD 304 switches the second radio 308-2 to monitor multiple links (e.g., Link1 301-1 and Link2 301-2) at a second time 332 after the predetermined time boundary 330.

Figure 4:
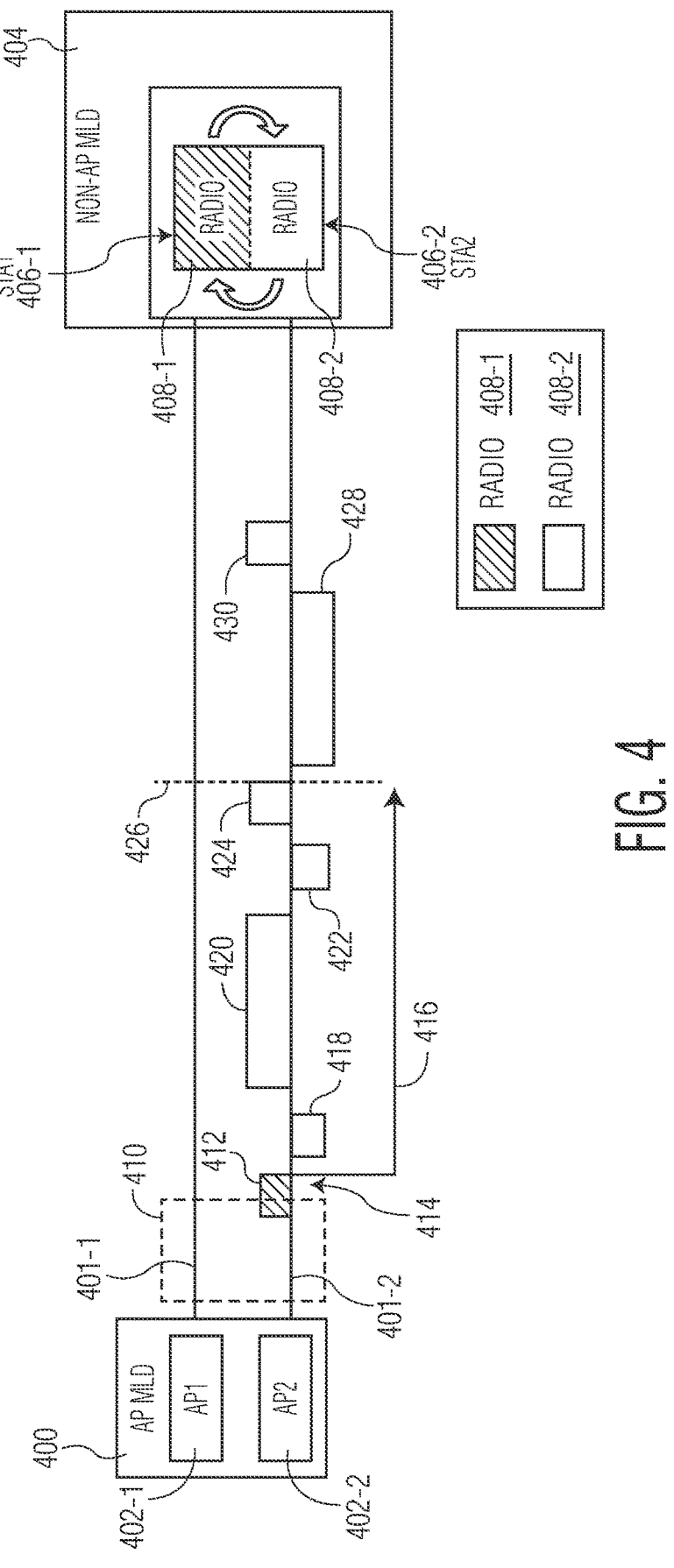
FIG. 4 illustrates another example of an event where a non-AP MLD switches from frame exchanges in a link to monitoring multiple links.

FIG. 4 illustrates another example of an event where a non-AP MLD switches from frame exchanges in a link to monitoring multiple links. In an embodiment, FIG. 4 includes the AP MLD 400 with AP1 402-1 and AP2 402-2, the non-AP MLD 404 with STA1 406-1, STA2 406-2, the first radio 408-1, and the second radio 408-2, Link1 401-1, Link2 401-2, and exchange of the MU-RTS frame 412, the CTS frame 418, the first A-MPDU frame 420, the first BA frame 422, the trigger frame 424, the second A-MPDU frame 428, and the second BA frame 430 with the multiple link monitoring (shown by dashed box 410), the radio switch at the first time 414, the eMLSR frame exchange sequence 416, and the radio switch at the second time 426 as previously described with reference to FIG. 3.

In contrast to FIG. 3, the trigger frame 424 received by STA2 406-2 may have a TA that differs from the TA of the MU-RTS frame 412, or may be addressed to another STA (e.g., STA3 (not shown)). As such, the eMLSR frame exchange sequence 416 ends after STA2 406-2 receives the trigger frame 424, and at the second time 426, the non-AP MLD 404 monitors multiple links after the radio switch at the first time 414 (e.g., where the second radio 408-2 monitors Link1 401-1 and the first radio 408-1 monitors Link2 401-2). In addition, the second BA frame 430 transmitted by AP2 402-2 may be addressed to the other STA (e.g., STA3).

Figure 5:
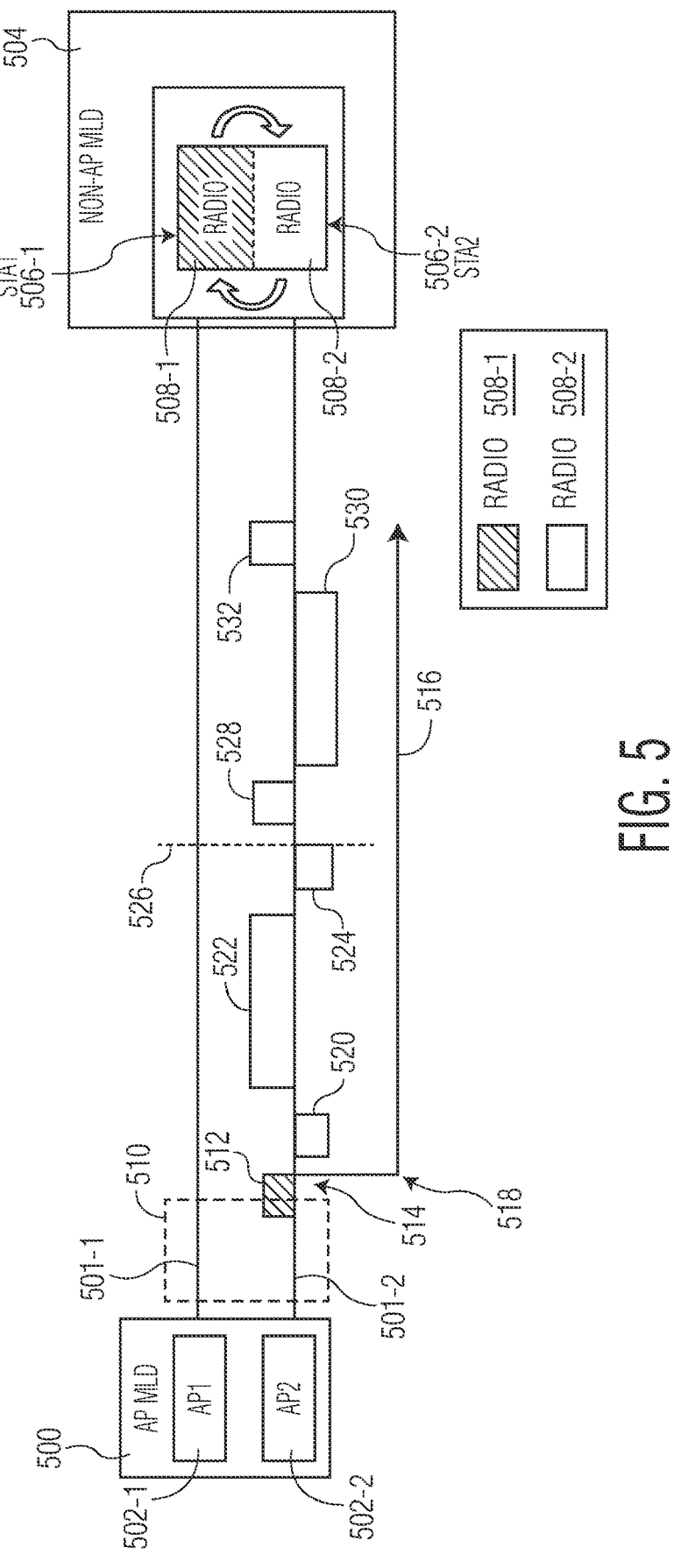
FIG. 5 illustrates another example of an event where a non-AP MLD switches from frame exchanges in a link to monitoring multiple links.

FIG. 5 illustrates another example of an event where a non-AP MLD switches from frame exchanges in a link to monitoring multiple links. In an embodiment, FIG. 5 includes the AP MLD 500 with AP1 502-1 and AP2 502-2, the non-AP MLD 504 with STA1 506-1, STA2 506-2, the first radio 508-1, and the second radio 508-2, Link1 501-1, Link2 501-2, and exchange of the MU-RTS frame 512, the CTS frame 520, the first A-MPDU frame 522, the first BA frame 524, the trigger frame 528, the second A-MPDU frame 530, and the second BA frame 532 with the multiple link monitoring (shown by dashed box 510), the radio switch at the first time 514, the eMLSR frame exchange sequence 516, and the radio switch at the second time 526 as previously described with reference to FIG. 3.

In contrast to FIG. 3, an eMLSR timer 518 starts when the eMLSR frame exchange sequence 516 begins, and the first A-MPDU frame 522 includes an EMLO Control field that indicates to the non-AP MLD 504, when the frame exchange sequence 516 ends. As such, the non-AP MLD 504 switches from the frame exchanges in Link2 501-2 to monitoring multiple links after the radio switching (e.g., where second radio 508-2 monitors Link1 501-1 and the first radio 508-1 monitors Link2 501-2). In an embodiment, the first A-MPDU frame 522 may need to solicit the first BA frame (or Ack frame) 524, such that the first BA frame 524 indicates, to the AP MLD 500, that the non-AP MLD 504 has switched to monitoring multiple links. As such, STA2 506-2 cancels the eMLSR timer 518 and switches the first radio 508-1 and the second radio 508-2 to monitor the multiple links at the second time 526. In an embodiment, the trigger frame 528 received by STA2 506-2 may have a TA that differs from the TA of the MU-RTS frame 512, or may be addressed to another STA (e.g., STA3 (not shown)). Additionally, the second BA frame 532 transmitted by AP2 502-2 may be addressed to the other STA (e.g., STA3).

Figure 6:
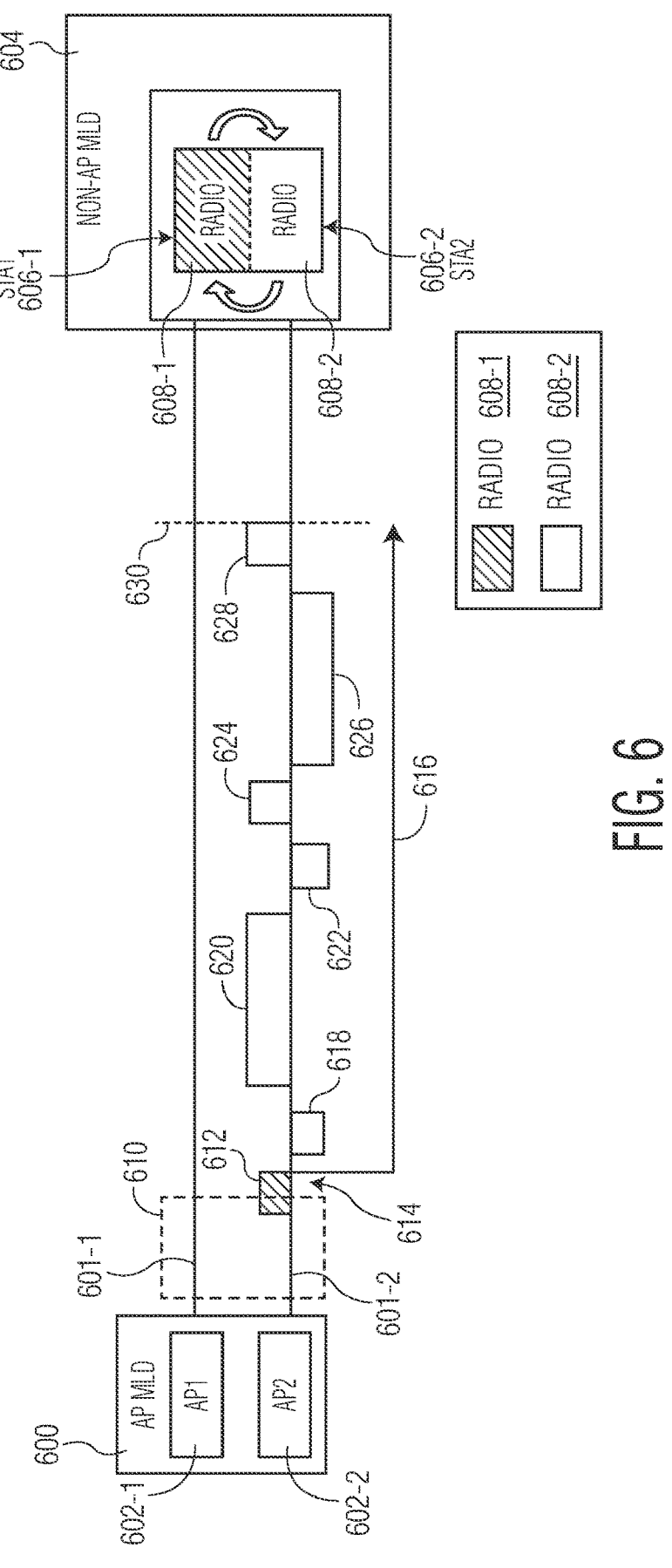
FIG. 6 illustrates another example of an event where a non-AP MLD switches from frame exchanges in a link to monitoring multiple links.

FIG. 6 illustrates another example of an event where a non-AP MLD switches from frame exchanges in a link to monitoring multiple links. In an embodiment, FIG. 6 includes the AP MLD 600 with AP1 602-1 and AP2 602-2, the non-AP MLD 604 with STA1 606-1, STA2 606-2, the first radio 608-1, and the second radio 608-2, Link1 601-1, Link2 601-2, and exchange of the MU-RTS frame 612, the CTS frame 618, the first A-MPDU frame 620, the first BA frame 622, the trigger frame 624, the second A-MPDU frame 626, and the second BA frame 628 with the multiple link monitoring (shown by dashed box 610), the radio switch at the first time 614, and the radio switch at the second time 630 as previously described with reference to FIG. 3.

In contrast to FIG. 3, a TXOP 616 begins when STA2 606-2 receives the MU-RTS frame 612. In an embodiment, the second radio 608-2 is switched to Link2 601-2 for frame exchanges after receiving the MU-RTS frame 612. In such an embodiment, the non-AP MLD 604 switches from frame exchanges in Link2 601-2 to monitoring the multiple links (e.g., Link1 601-1 and Link2 601-2) when the TXOP 616 ends at the second time 630.

In some embodiments, when an AP initiates a TXOP that includes an STA affiliated with a non-AP MLD operating according to an eMLSR mode, switching from frame exchanges in a link to monitoring multiple links may be determined by frame exchanges initiated by the AP. As an example, after a successful initial frame exchange where an MU-RTS frame, a CTS frame, a Buffer Status Report Poll (BSRP) Trigger frame, and a Quality of Service (QoS) Null frame are exchanged between an AP (e.g., AP1) and an STA (e.g., STA1 of an eMLSR MLD) on a link (e.g., Link1), STA1 may transmit and/or receive frames during frame exchanges initiated by AP1 unless an event occurs, in which case the radio switches to monitoring multiple links.

As an example, the event may be that STA1 does not detect a following PPDU within a predetermined time boundary (e.g., SIFS or PIFS), after the eMLSR MLD transmits a responding PPDU or after the eMLSR receives a DL frame that does not solicit the responding frame. As another example, the event may be that STA1 detects the following PPDU within the predetermined time boundary after the eMLSR MLD transmits the responding PPDU or after the eMLSR receives the DL frame that does not solicit the responding frame, and that a detected PPDU does not include the receive frame having a Receiver Address (RA) that is a unicast address of STA1, the received frame being a trigger frame, a Null Data Packet Announcement (NDPA) frame, or a multi-STA BA frame that includes an Association Identifier (AID) (e.g., AID0 to AID11) of the STA, or the received frame being a CTS to self frame from an associated AP. As another example, the event may be that STA1 receives a frame from the AP that solicits a response, and STA1 cannot transmit the response.

In some embodiments, an AP (or an AP MLD) and an STA (or a non-AP MLD) may exchange frames to initiate a TXOP sharing mode. In an embodiment, a first TXOP sharing mode includes the AP allocating a duration (e.g., part or all of a remaining amount of time) of a TXOP to the STA, where the STA determines a PPDU length, a Modulation and Coding Scheme (MCS), and a number of spatial streams (Nss) for initiating additional frame exchanges with the AP during the allocated duration. In such an embodiment, the first TXOP sharing mode also includes the AP performing a medium access recovery (e.g., PIFS recovery or a backoff recovery) if a frame exchange fails within the allocated duration. In an embodiment, a second TXOP sharing mode includes the AP allocating the duration of the TXOP to the STA, where the STA determines the PPDU length, the MCS, and the Nss for initiating additional frame exchanges with a Peer-to-Peer (P2P) peer STA or the AP during the allocated duration. In such an embodiment, the second TXOP sharing mode also includes the STA performing the medium access recovery if a frame exchange fails within the allocated duration.

In some embodiments, if an AP allocates part of its remaining TXOP duration to an STA, the AP may transmit frames within the remaining duration of the TXOP when an embodiment as described herein occurs. In one embodiment, the AP may transmit frames within the remaining duration of the TXOP when a medium is idle for PIFS after an end of the allocated duration (e.g., the medium is idle at the end of the allocated duration). In another embodiment, the AP may transmit frames within the remaining duration of the TXOP when a last frame transmitted by the AP ends less than SIFS before an end of the allocated duration and the medium is idle for SIFS. In yet another embodiment, the AP may transmit frames within the remaining duration of the TXOP when the medium is idle for PIFS after the medium is busy at the end of the allocated duration. In yet another embodiment, the AP may transmit frames within the remaining duration of the TXOP SIFS after acknowledging a frame that indicates that the STA releases the allocated duration back to the AP.

In some embodiments, there may be a need to define rules for switching from frame exchanges in a link (that are initiated by an STA) to monitoring multiple links based on the frame exchanges initiated by the STA during a duration allocated to the STA in a TXOP where the AP is a TXOP holder.

In some embodiments, after a successful initial frame exchange where an MU-RTS frame and a CTS frame or a BSRP Trigger frame, and a QoS Null frame are exchanged between an AP (e.g., AP1) and an STA (e.g., STA1 of an eMLSR MLD) on a link (e.g., Link1), and a successful exchange of an MU-RTS TXOP Sharing (TXS) frame and a CTS frame for a first triggered TXOP sharing mode with STA1 on Link1, STA1 transmits and/or receives frames during frame exchanges initiated by STA1 unless an event occurs, in which case the radio switches to monitor multiple links (e.g., the eMLSR MLD monitors multiple links). As an example, the event may be that STA1 does not detect a responding PPDU within a predetermined time boundary (e.g., SIFS or PIFS) after transmitting a soliciting PPDU. As another example, the event may be that STA1 detects a following PPDU within a predetermined time after transmitting a soliciting PPDU, where a detected frame in the following PPDU does not include an RA of STA1. As yet another example, the event may be that STA1 detects a following PPDU where a BSS color included in a PPDU PHY header indicates a neighbor BSS. As yet another example, the event may be that STA1 receives a responding frame solicited by STA1, where the responding frame includes an indication to release the allocated duration to the AP. Although described with reference to an eMLSR MLD, such embodiments and/or examples may also be implemented by an eMLMR MLD.

In some embodiments, after a successful initial frame exchange where an MU-RTS frame and a CTS frame or a BSRP Trigger frame, and a QoS Null frame are exchanged between an AP (e.g., AP1) and an STA (e.g., STA1 of an eMLSR MLD) on a link (e.g., Link1), and a successful exchange of an MU-RTS TXS frame and a CTS frame for a second triggered TXOP sharing mode with STA1 on Link1, STA1 transmits and/or receives frames during frame exchanges initiated by STA1 with another STA or AP within an allocated duration unless an event occurs, in which case the eMLSR MLD switches to monitor multiple links. As an example, the event may be an end of an allocated duration. As yet another example, the event may be the end of the allocated duration where an AP cannot transmit a following PPDU with SIFS. As yet another example, the event may be that STA1 does not detect a responding PPDU within a predetermined time after transmitting a soliciting PPDU. In such an example, STA1 can perform a PIFS recovery, a backoff recovery, or monitor multiple links. Although described with reference to an eMLSR MLD, such embodiments and/or examples may also be implemented by an eMLMR MLD.

In some embodiments, a non-AP MLD can announce its eMLSR support and part of its links operating according to an eMLSR mode while other links support simultaneous transmit and receive (STR) operation, i.e., the non-AP MLD that supports the eMLSR mode can have more than one simultaneous link (full functional radio). As an example, a non-AP MLD may include a 2.4 GHz link, a 5 GHz link, and a 6 GHz link where a link pair of the 2.4 GHz link and the 5 GHz link and a link pair of the 2.4 GHz link and the 6 GHz link may support STR (e.g., STR links) with two radios and a link pair of the 5 GHz link and the 6 GHz link may support eMLSR operations.

In some embodiments, the 5 GHz link and the 6 GHz link of the non-AP MLD can switch between a Multi-Link Single-Radio (MLSR) mode and an eMLSR mode. In an embodiment, one radio may be dedicated to the 2.4 GHz link and the other radio associated with the 5 GHz link or the 6 GHz link. In some embodiments, the 2.4 GHz link and the 5 GHz link are an STR link pair, and the 2.4 GHz link and the 6 GHz link are another STR link pair. In some embodiments, the 5 GHz link and the 6 GHz link can switch between a non-STR (NSTR) link pair and an eMLSR link pair.

In some embodiments, a non-AP MLD can announce that it includes STR link pairs and link pairs that can switch between an NSTR Multi-Link Multi-Radio (MLMR) mode and an eMLMR mode. As an example, the non-AP MLD may have three radios and three STR links. In such an example, the three STR links may include a 2.4 GHz link, a 5 GHz link, and a 6 GHz link. In an embodiment, one radio may be dedicated to the 2.4 GHz link, another radio that supports one spatial stream (SS) may be associated with the 5 GHz link, and another radio that supports one SS may be associated with the 6 GHz link. In some embodiments, the 2.4 GHz link and the 5 GHz link are an STR link pair, and the 2.4 GHz link and the 6 GHz link are another STR link pair. In some embodiments, the 5 GHz link and the 6 GHz link can switch between an NSTR link pair and an eMLMR link pair. In such an embodiment, when the 5 GHz link and the 6 GHz link are the eMLMR link pair, each link has one SS to monitor the link. As an example, after receiving an initiating trigger frame of a TXOP in a link (e.g., the 5 GHz link or the 6 GHz link), the non-AP MLD uses two SS to receive and/or transmit PPDUs during a remaining duration of the TXOP.

In some embodiments, when an STA of a non-AP MLD (e.g., an eMLSR MLD) initiates a TXOP, the eMLSR MLD may switch back to monitoring multiple links (e.g., eMLSR links) after a time duration indicated by an eMLSR Transition Delay subfield after an end of a TXOP, and an AP of an AP MLD may initiate frame exchanges on one of the eMLSR links after the time duration indicated by the eMLSR Transition delay subfield after the end of the TXOP. In such an embodiment, whether blindness should be considered when switching to monitor the multiple links is not clear. If needed in such an embodiment, conventional blindness procedures may need to be changed.

In some embodiments, when a non-AP MLD (e.g., an eMLSR non-AP MLD or an eMLMR non-AP MLD) switches back to monitoring multiple links after exchanging frames using one link (e.g., where an STA of the eMLSR/eMLMR non-AP MLD that does frame exchanges is either a TXOP holder or a TXOP responder), the non-AP MLD performs a medium access recovery after the device switches to monitoring the multiple links.

In an embodiment, an STA (e.g., STA1) of the non-AP MLD that has lost medium synchronization due to frame exchanges of another STA (e.g., STA2) of the non-AP MLD (e.g., that is a TXOP holder or a TXOP responder) shall start a MediumSyncDelay timer after the non-AP MLD uses STA1 to monitor the link(s) (e.g., multiple links associated with STA1 and STA2) if the frame exchanges of STA1 are longer than a MediumSyncThreshold. In such an embodiment, STA1 may not start the MediumSyncDelay timer if the frame exchanges of STA2 are less than or equal to a MediumSyncThreshold. Alternatively, in such an embodiment, STA2 may not start the MediumSyncDelay timer. Such embodiments described herein may be implemented when the non-AP MLD does not include a low cost radio. However, when the non-AP MLD includes a low cost radio for link monitoring and a full-functional radio for frame exchanges, STA1 may not start the MediumSyncDelay timer if a transmission event of STA2 is less than or equal to a MediumSyncThreshold.

In some embodiments, within one TXOP that includes both downlink data/management frame transmissions and uplink data/management frame transmissions that are transmitted to and/or from an eMLSR non-AP MLD, an AP MLD may solicit an uplink frame transmission at the beginning of the TXOP using a trigger frame. In such an embodiment, the AP MLD may transmit the downlink data/management frames after completing the uplink data/management frame transmission.

In some embodiments, an eMLSR non-AP MLD may notify an associated AP MLD that the eMLSR non-AP MLD is capable of link monitoring when the eMLSR non-AP MLD transmits a PPDU during frame exchanges with the AP MLD in another link. In such an embodiment, the AP MLD may use the notification, such that within one TXOP with both downlink data/management frame transmissions and uplink data/management frame transmissions, the AP MLD may solicit an uplink frame transmission at the beginning of the TXOP using a trigger frame. In such an embodiment, the AP MLD may transmit the downlink data/management frames after completing the uplink data/management frame transmission. As such, the eMLSR non-AP MLD that is associated with the AP MLD is less likely to start a MediumSyncDelay timer.

In some embodiments, if a non-AP MLD (e.g., an eMLSR non-AP MLD or an eMLMR non-AP MLD) uses multiple STAs to monitor multiple links, the STAs set a Network Allocation Vector (NAV) when the STAs detect a Duration field included in a received PPDU (e.g., in a <24 megabits per second (Mbps) non-High Throughput (non-HT) duplicate PPDU). In an embodiment, within a multi-link BSS, when the eMLSR non-AP MLDs and/or eMLMR non-AP MLD exist in the BSS, a TXOP that is not initiated by a non-HT duplicate PPDU with ≤24 Mbps may not be protected.

To address that the non-HT duplicate PPDU with ≤24 Mbps may not be protected, an AP MLD can announce the existence of an eMLSR non-AP MLD and/or an eMLMR non-AP MLD through an EHT Operation element or a Multi-Link element. As such, APs of the AP MLD may set a TXOP Duration RTS Threshold field to a minimal value so that associated HE STAs transmit RTS frames in non-HT duplicate PPDUs to protect their TXOPs. In one embodiment, once an AP MLD finds an associated non-AP MLD that supports eMLSR/eMLMR operation (e.g., an eMLSR non-AP MLD and/or an eMLMR non-AP MLD), the AP MLD announces the existence of eMLSR/eMLMR non-AP MLDs in its multi-link BSS. In another embodiment, when there is at least one non-AP MLD working in eMLSR/eMLMR mode, the AP MLD announces the existence of eMLSR/eMLMR non-AP MLDs in its multi-link BSS. In some embodiments, an enhancement may be that the non-AP MLD announces links where the eMLSR/eMLMR non-AP MLD(s) work (e.g., can exchange frames). In some embodiments, when an STA of an associated non-AP MLD initiates a TXOP in a BSS whose AP (AP MLD with which the AP is affiliated) announces the existence of eMLSR

17

18 non-AP MLDs, the STA transmits a first frame in a non-HT duplicate PPDU with ≤24 Mbps.

Figure 7:
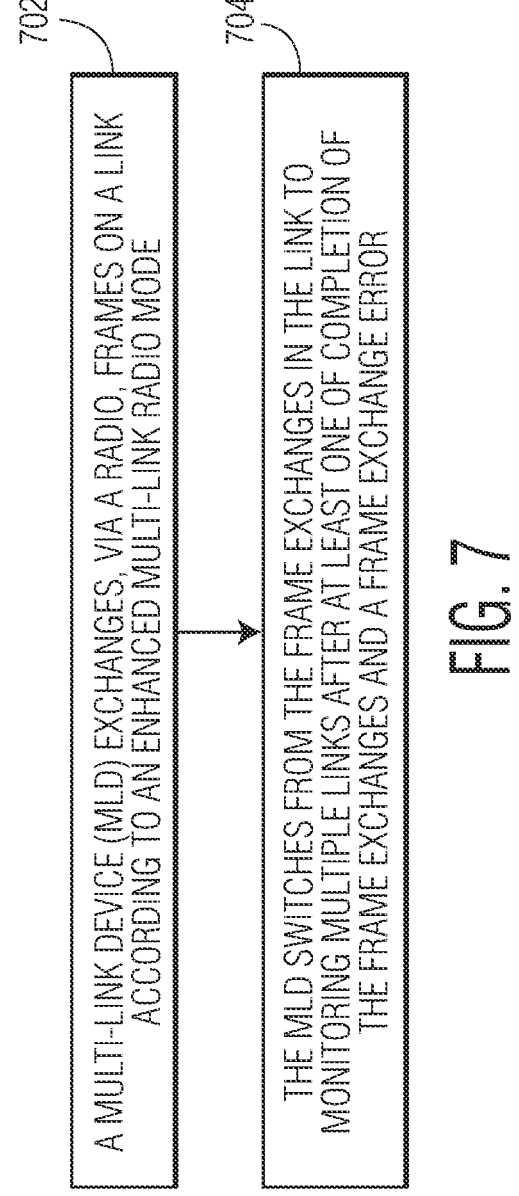
FIG. 7 illustrates a flow diagram of a technique for enhanced multi-link operations in accordance with an embodiment of the invention.

FIG. 7 illustrates a flow diagram of a technique for enhanced multi-link operations in accordance with an embodiment of the invention. At block 702, an MLD exchanges, via a radio, frames on a link according to an enhanced multi-link radio mode. At block 704, the MLD switches from the frame exchanges in the link to monitoring multiple links after at least one of completion of the frame exchanges and a frame exchange error.

In some embodiments, the technique for multi-link operations may be implemented by a device (e.g., a non-AP MLD). For example, a device may include a wireless network interface device implemented on one or more ICs, where the wireless network interface device is configured to exchange, via a radio associated with a link, frames according to an enhanced multi-link radio mode, and switch from the frame exchanges in the link to monitoring multiple links after at least one of completion of the frame exchanges and a frame exchange error.

In some embodiments, the technique for multi-link operations may be implemented by a system. For example, a system includes a first MLD (e.g., AP MLD), where the first MLD includes a wireless network interface device implemented on one or more ICs, and where the wireless network interface device is configured to exchange frames. In such an example, the system also includes a second MLD (e.g., a non-AP MLD), where the second MLD includes another wireless network interface device implemented on one or more other ICs, and where the other wireless network interface device is configured to exchange, via a radio associated with a link, the frames with the first MLD according to an enhanced multi-link radio mode, and switch from the frame exchanges in the link to monitoring multiple links after at least one of completion of the frame exchanges and a frame exchange error.

Figure 8:
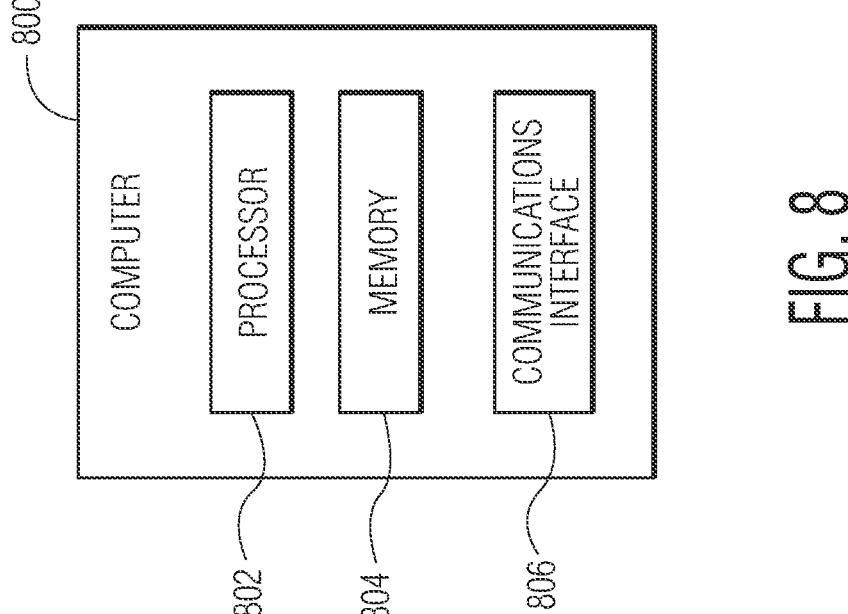
FIG. 8 depicts an example of a computer that can implement the technique for enhanced multi-link operations as described with reference to FIG. 7.

In an embodiment, the above-described functionality is performed at least in part by a computer or computers, which executes computer readable instructions. FIG. 8 depicts an example of a computer 800 that can implement the technique for enhanced multi-link operations as described herein with reference to FIG. 7. As shown, the computer 800 includes a processor 802, a memory 804, and a communications interface 806. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 800 may represent an MLD (e.g., an AP MLD or a non-AP MLD). In such an example, the MLD includes a wireless network interface device implemented on one or more ICs. As an example, the wireless network interface device may include and/or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
a wireless network interface device implemented on one or more integrated circuits (ICs),
wherein the wireless network interface device is configured to:
exchange, via a radio associated with a link, frames according to an enhanced multi-link radio mode; and
switch from the frame exchanges in the link to monitoring multiple links after at least one of completion of the frame exchanges and a frame exchange error;
wherein the frames are exchanged to initiate a first triggered Transmission Opportunity (TXOP) sharing mode, and
wherein the first triggered TXOP sharing mode includes: an access point (AP) allocating a duration of a TXOP to a station (STA) of the device,
wherein the STA determines a Physical Layer Convergence Procedure (PLCP) Protocol Data Unit (PPDU) length, a Modulation and Coding Scheme (MCS), and a number of spatial streams (Nss) for initiating additional frame exchanges with the AP during the allocated duration; and
the STA exchanging the additional frames during the allocated duration unless the STA does not detect a responding PPDU within a predetermined time after transmitting a soliciting PPDU.

2. The device of claim 1, wherein the device switches to monitoring the multiple links when a station (STA) of the device receives a frame addressed to another STA.

3. The device of claim 1, wherein the device switches to monitoring the multiple links when an STA of the device receives a frame with a Transmitter Address (TA) that differs from another TA of another frame that initiated the frame exchanges.

4. The device of claim 1, wherein the device switches to monitoring the multiple links when an STA of the device receives a PPDU from an Overlapping Basic Service Set (OBSS).

5. The device of claim 1,
wherein the device switches to monitoring the multiple links when a Coding Scheme (CS) mechanism indicates that a medium is idle at a predetermined time boundary; and
wherein the predetermined time boundary is at least one of a Transmission (Tx) Point Coordination Function (PCF) Interframe Space (PIFS) (TxPIFS) slot boundary and a Tx Short Interframe Space (SIFS) (TxSIFS) slot boundary.

6. The device of claim 1,
wherein an enhanced Multi-Link Single-Radio (eMLSR) timer starts when the device exchanges the frames; and
wherein the device switches to monitoring the multiple links when a timeout of the eMLSR timer occurs.

7. The device of claim 1, wherein the device receives an indication included an Enhanced Multi-Link Operation (EMLO) Control field of a frame that solicits at least one of an Acknowledgement (Ack) frame and a Block Ack (BA) frame; and
wherein the device switches to monitoring the multiple links when the device receives the indication included in the EMLO Control field.

8. The device of claim 1, wherein the device switches to monitoring the multiple links when a TXOP ends.

9. The device of claim 1, wherein the first triggered TXOP sharing mode further includes:
the STA exchanging the additional frames during the allocated duration unless the STA detects a following PPDU within a predetermined time after transmitting a soliciting PPDU, wherein a detected frame in the following PPDU does not include a Receiver Address (RA) of the STA.

10. The device of claim 1, wherein the first triggered TXOP sharing mode further includes:
the STA exchanging the additional frames during the allocated duration unless the STA receives a responding frame solicited by the STA, wherein the responding frame includes an indication to release the allocated duration to the AP.

11. The device of claim 1, wherein the frames are exchanged to initiate a second triggered TXOP sharing mode, and wherein the second triggered TXOP sharing mode includes:
the AP allocating a duration of a second TXOP to the STA of the device, wherein the STA determines a PPDU length, an MCS, and an Nss for initiating additional frame exchanges with at least one of a peer STA and the AP during the allocated duration of the second TXOP; and
the STA exchanging the additional frames during the allocated duration of the second TXOP unless the STA receives a responding frame solicited by the STA, wherein the responding frame includes an indication to release the allocated duration of the second TXOP to the AP.

12. The device of claim 1, wherein the frames are exchanged to initiate a second triggered TXOP sharing mode, and wherein the second triggered TXOP sharing mode includes:

the AP allocating a duration of a second TXOP to the STA of the device, wherein the STA determines a PPDU length, an MCS, and an Nss for initiating additional frame exchanges with at least one of a peer STA and the AP during the allocated duration of the second TXOP; and
the STA exchanging the additional frames during the allocated duration of the second TXOP unless the STA does not detect a responding PPDU within a predetermined time after transmitting a soliciting PPDU.

13. The device of claim 1, wherein the device is a non-AP multi-link device (MLD), and wherein the non-AP MLD announces that it includes simultaneous transmit and receive (STR) links that can switch between a Multi-Link Single-Radio (MLSR) mode and an enhanced MLSR (eMLSR) mode.

14. The device of claim 1, wherein the device is a non-AP MLD, and wherein the non-AP MLD announces that it includes STR links that can switch between a non-STR (NSTR) Multi-Link Multi-Radio (MLMR) mode and an enhanced MLMR (eMLMR) mode.

15. The device of claim 1, wherein the device is a non-AP MLD, and wherein the non-AP MLD performs a medium access recovery after the device switches to monitoring the multiple links.

16. The device of claim 1, wherein the device is a non-AP MLD, and wherein the non-AP MLD includes a less than full-functional radio for link monitoring and a full-functional radio for frame exchanges.

17. The device of claim 1, wherein the device is a non-AP MLD that uses STAs to monitor the multiple links, and wherein the STAs set a Network Allocation Vector (NAV) when the STAs detect a Duration field included in a received PPDU.

18. A device comprising:
a wireless network interface device implemented on one or more integrated circuits (ICs), wherein the wireless network interface device is configured to:
exchange, via a radio associated with a link, frames according to an enhanced multi-link radio mode; and
switch from the frame exchanges in the link to monitoring multiple links after at least one of completion of the frame exchanges and a frame exchange error;
wherein the frames are exchanged to initiate a first triggered Transmission Opportunity (TXOP) sharing mode, and
wherein the first triggered TXOP sharing mode includes:
an access point (AP) allocating a duration of a TXOP to a station (STA) of the device,
wherein the STA determines a Physical Layer Convergence Procedure (PLCP) Protocol Data Unit (PPDU) length, a Modulation and Coding Scheme (MCS), and a number of spatial streams (Nss) for initiating additional frame exchanges with the AP during the allocated duration; and
the STA exchanging the additional frames during the allocated duration unless the STA detects a following PPDU within a predetermined time after transmitting a soliciting PPDU,
wherein a detected frame in the following PPDU does not include a Receiver Address (RA) of the STA.

19. A device comprising:
a wireless network interface device implemented on one or more integrated circuits (ICs), wherein the wireless network interface device is configured to:
exchange, via a radio associated with a link, frames according to an enhanced multi-link radio mode; and switch from the frame exchanges in the link to monitoring multiple links after at least one of completion
of the frame exchanges and a frame exchange error;
wherein the frames are exchanged to initiate a first
triggered Transmission Opportunity (TXOP) sharing
mode, and
wherein the first triggered TXOP sharing mode includes:
an access point (AP) allocating a duration of a TXOP
to a station (STA) of the device,
wherein the STA determines a Physical Layer Convergence Procedure (PLCP) Protocol Data Unit (PPDU)
length, a Modulation and Coding Scheme (MCS), and
a number of spatial streams (Nss) for initiating additional frame exchanges with the AP during the allocated
duration; and
the STA exchanging the additional frames during the
allocated duration unless the STA receives a responding
frame solicited by the STA,
wherein the responding frame includes an indication to
release the allocated duration to the AP.

\* \* \* \* \*